US006047944A

United States Patent [19]

Hajek, Jr.

[11] Patent Number: 6,047,944

[45] Date of Patent: Apr. 11, 2000

[54] POPPET WITH A FLOW INCREASING ELEMENT FOR LIMITING MOVEMENT THEREOF IN A POPPET VALVE

[75] Inventor: Thomas J. Hajek, Jr., Lockport, Ill.

[73] Assignee: Caterpillar Inc., Peoria, Ill.

[21] Appl. No.: 09/257,114

[22] Filed: Feb. 25, 1999

[51] Int. Cl.$^{7}$ .................... F16K 31/12

[52] U.S. Cl. .................... 251/35; 251/42

[58] Field of Search .................... 251/35, 42

[56] References Cited

U.S. PATENT DOCUMENTS

| | | | |
|---|---|---|---|
| 2,672,888 | 3/1954 | Shields | 251/42 X |
| 3,279,743 | 10/1966 | De La Garza | 251/35 X |
| 3,858,841 | 1/1975 | Haynes | 251/42 X |
| 4,671,485 | 6/1987 | Saarem | 251/42 X |
| 4,893,645 | 1/1990 | Augustinas et al. | 251/42 X |
| 4,920,861 | 5/1990 | Lorimor | 91/446 |
| 5,137,254 | 8/1992 | Aardema et al. | 251/35 |
| 5,645,263 | 7/1997 | Aardema | 251/35 X |

*Primary Examiner*—Denise L. Ferensic
*Assistant Examiner*—John Bastianelli
*Attorney, Agent, or Firm*—Haverstock, Garrett & Roberts

[57] ABSTRACT

A poppet adapted for movement in a passage extending between an inlet port and a control chamber of a poppet valve for controlling a fluid flow rate into the control chamber from the inlet port responsive to changes in a fluid flow rate from the control chamber, the poppet including at least one metering port positioned for communicating with the control chamber, a conduit connecting the metering port with an opening positioned for communicating with the inlet port for the flow of the fluid from the inlet port to the metering port, and at least one flow increasing element communicating with the conduit positioned to be covered by an inner sidewall when the poppet is within a predetermined range of displacement from a closed position toward the control chamber, the flow increasing element being increasingly exposed to the control chamber when the poppet is displaced toward the control chamber beyond the range, and the flow increasing element cooperating with the metering port when the poppet is at a predetermined stop position beyond the range to provide a fluid flow rate to the control chamber greater than the fluid flow rate from the control chamber for limiting the movement of the poppet beyond the stop position responsive to further increases in the fluid flow rate from the control chamber.

9 Claims, 3 Drawing Sheets

POPPET WITH A FLOW INCREASING ELEMENT FOR LIMITING MOVEMENT THEREOF IN A POPPET VALVE

TECHNICAL FIELD

This invention relates generally to a poppet for a poppet valve, and more particularly, to a poppet having a flow increasing element for limiting movement thereof in a poppet valve for providing improved operability and eliminating the need for a physical stop for limiting such movement.

BACKGROUND ART

Poppet valves are used in a wide variety of applications, such as for controlling the exhausting of a fluid such as a hydraulic oil from cylinders, motors and other working elements. Fluid flow from an inlet port through the poppet valve to an outlet port thereof is typically controlled by controllably moving a poppet of the poppet valve between a first or closed position in sealed relation to a seat and a maximum open or second position displaced from the seat, through a range of partially open positions. Typically, the poppet includes at least one conduit therethrough communicating the inlet port with a control chamber at the back side of the poppet. The fluid pressure in the control chamber exerts a closing force on the poppet holding it against the seat. A spring is also generally used to hold the poppet against the seat when the pressure conditions in the inlet port, control chamber, and an outlet port, are equalized.

Controls for operably controlling the opening of the poppet are well known. Such known controls typically include a control valve operable for allowing fluid flow from the control chamber to another location such as the outlet port of the poppet through a variable regulating or flow control orifice, under control of a pilot fluid signal, a solenoid, or the like. Such known controls further typically have a predetermined maximum area for the flow of the fluid from the control chamber, and the poppet typically includes a metering port operable in cooperation with a metering edge on a sidewall of the valve housing for regulating fluid flow into the control chamber from the conduit through the poppet. To control the movement of the poppet once the fluid flow rate into the control chamber reaches the flow rate from the control chamber, a physical stop is provided, or the poppet is allowed to contact the back wall of the control chamber.

However, it is desirable to eliminate the need for the physical stop. Also, allowing the poppet to contact the back wall of the control chamber can result in the poppet hydraulically locking to the back face of the chamber, causing control and operational problems when the control signal is diminished and the poppet is required to move to a lower flow rate position. Additionally, in some instances it is desirable to provide stop means for the poppet at an intermediate location, which is difficult to achieve using a physical stop.

Accordingly, the present invention is directed to overcoming one or more of the problems as set forth above.

DISCLOSURE OF THE INVENTION

In one aspect of the present invention an improved poppet adapted for movement in a passage extending between an inlet port and a control chamber of a poppet valve for controlling a fluid flow rate into the control chamber from the inlet port responsive to changes in a fluid flow rate from the control chamber is disclosed. The present poppet includes at least one metering port and a conduit connecting the metering port with an opening positioned for communicating with the inlet port for the flow of the fluid from the inlet port to the metering port. The metering port is positioned to be at least substantially covered by a sidewall of the poppet valve defining the passage when the poppet is in a closed position in the passage for preventing fluid flow between the inlet port and an outlet port of the poppet valve and to be increasingly exposed to the control chamber when the poppet is displaced from the closed position toward the control chamber for increasing the fluid flow rate to the control chamber responsive to increases in the fluid flow rate from the control chamber. The poppet includes at least one flow increasing element communicating with the conduit positioned to be covered by the inner sidewall when the poppet is within a predetermined range of displacement from the closed position toward the control chamber and to be increasingly exposed to the control chamber when the poppet is displaced toward the control chamber beyond the range, the flow increasing element cooperating with the metering port when the poppet is at a predetermined stop position beyond the range to provide a fluid flow rate to the control chamber greater than the fluid flow rate from the control chamber for limiting the movement of the poppet beyond the stop position responsive to further increases in the fluid flow rate from the control chamber.

According to one preferred aspect of the invention, the flow increasing element is a groove communicating with the conduit extending at least partially around the poppet. According to another preferred aspect of the invention, the flow increasing element is a bore extending from an outer surface of the poppet to the conduit.

According to another preferred aspect of the invention, the flow increasing element is positioned such that the poppet is movable beyond the stop position when the fluid flow rate from the control chamber exceeds the fluid flow rate thereto.

BEST MODE FOR CARRYING OUT THE INVENTION

Figure 1:
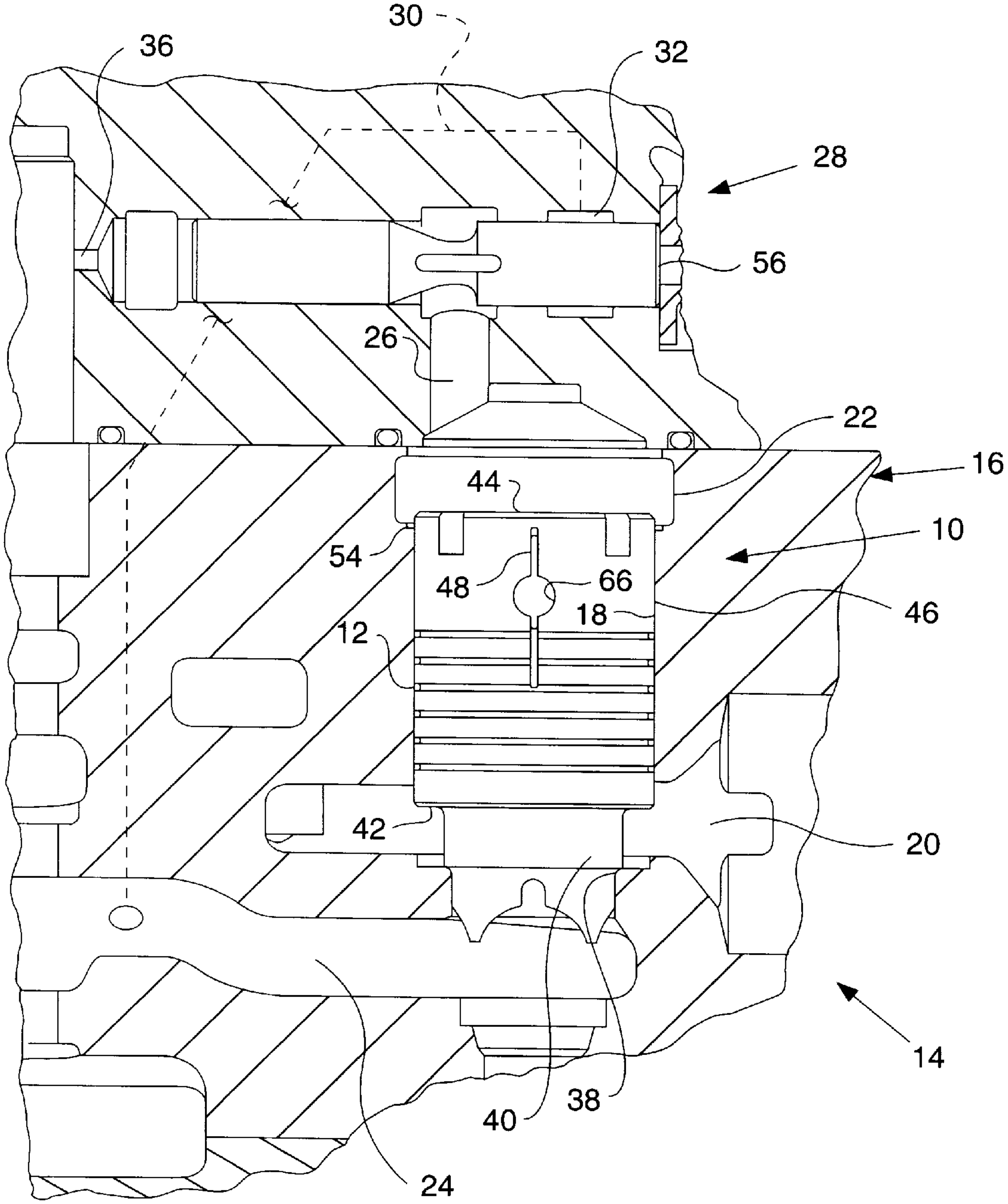
FIG. 1 is a fragmentary side elevational view in partial cross-section of a poppet valve including a poppet according to the present invention.

Referring now to the drawings, FIG. 1 shows a poppet 10 constructed and operable according to the teachings of the present invention in operative position in a passage 12 of a poppet valve 14. Poppet valve 14 is of conventional construction and includes a housing 16 having a sidewall 18 defining passage 12 which extends between an inlet port 20 and a control chamber 22. Housing 16 additionally forms an outlet port 24 of valve 14; an inlet port 26 of a control 28 operable for controlling valve 14; a return conduit 30 communicating an outlet port 32 of control 28 with outlet port 24 of valve 14; and a pilot signal conduit 36 communicating control 28 with a pilot signal source (not shown). Alternatively, return conduit 30 could be directly connected to a reservoir as opposed to being connected to outlet port 24. Housing 16 includes a valve seat 38 extending around a passage connecting inlet port 20 and outlet port 24 of valve 14, poppet 10 including a valve portion 40 sealably engagable with valve seat 38 for preventing communication between inlet port 20 and outlet port 24 when poppet 10 is in a closed position in passage 12 as shown. Poppet 10 includes an annular reaction surface 42 communicating with inlet port 20 such that fluid under pressure in inlet port 20 will urge poppet 10 toward control chamber 22. Another reaction surface 44 is located on poppet 10 opposite reaction surface 42 and is exposed to control chamber 22 such that fluid under pressure in control chamber 22 will act against poppet 10 in opposition to the force exerted thereagainst by pressure in inlet port 20. An optional compression spring (not shown) can additionally be used to resiliently urge poppet 10 toward valve seat 38.

Figure 2:
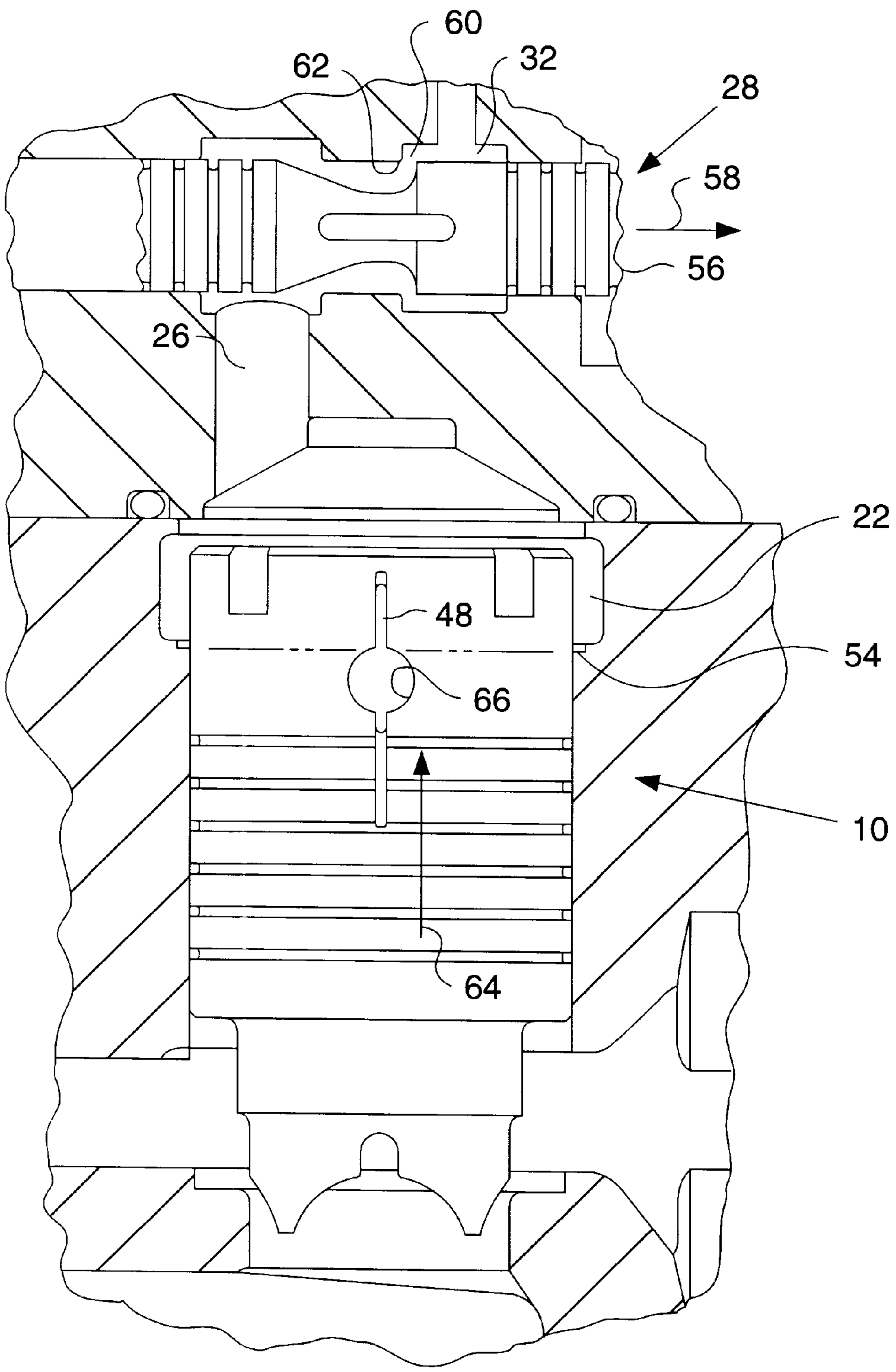
FIG. 2 is another fragmentary side elevational view in partial section of the poppet valve of FIG. 1, showing the poppet in a displaced position.
Figure 3:
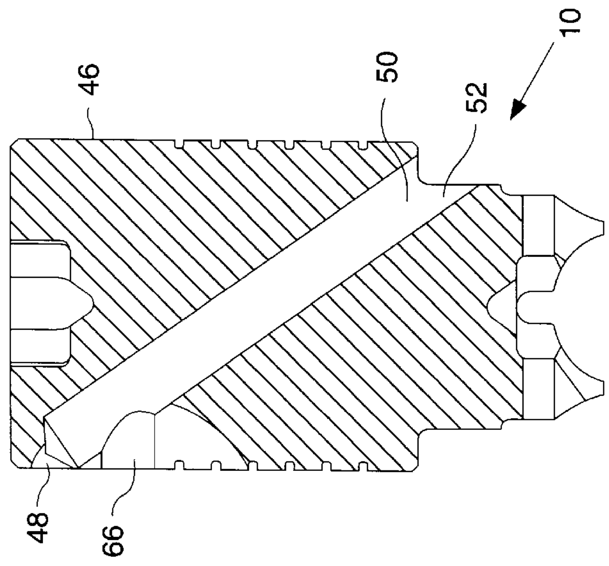
FIG. 3 is a sectional view of the poppet of FIGS. 1 and 2.

Referring also to FIG. 3, poppet 10 includes an outer surface 46 extending therearound and adapted to be located in intimate, face to face relation with sidewall 18 of housing 16. Importantly, poppet 10 includes an elongate metering port 48 in outer surface 46 communicating with a conduit 50 extending through poppet 10 to an opening 52 communicating with inlet port 20 for communicating fluid from inlet port 20 to metering port 48. Sidewall 18 of housing 16 forms a metering edge 54 which traverses metering port 48 at a juncture thereof with control chamber 22. When poppet 10 is in the closed position as shown in FIG. 1, at least a substantial portion of metering port 48 is covered by sidewall 18 such that little fluid is communicated from inlet port 20 to control chamber 22 via conduit 50 and metering port 48. Control 28 is operable under a control signal received through pilot signal conduit 36 to open to allow fluid in control chamber 22 to flow therefrom through inlet port 26 and outlet port 32 in the conventional manner by movement of a valve member 56 from a closed position (FIG. 1) through a range of open positions (FIG. 2).

Referring also to FIG. 2, valve member 56 is shown in an open position displaced from its closed position in the direction denoted by the arrow 58 to allow fluid flow from control chamber 22, the rate of fluid flow being determined at least in part by the size of an annular control area 60 between valve member 56 and an adjacent metering edge 62. Poppet 10 is movable or displaceable from the closed position (FIG. 1) toward control chamber 22 as denoted by the arrow 64, through a range of open positions wherein metering port 48 is increasingly exposed to control chamber 22, for increasing a flow rate of fluid from inlet port 20 to control chamber 22 responsive to increases in the fluid flow rate from control chamber 22.

Poppet 10 includes a flow increasing element 66 communicating with conduit 50 (FIG. 3) positioned to be covered by inner sidewall 18 of housing 16 when poppet 10 is within a predetermined range of displacement from the closed position toward control chamber 22, which range is shown by FIGS. 1 and 2. Importantly, flow increasing element 66 is increasingly exposed to control chamber 22 when poppet 10 is displaced further toward control chamber 22 beyond such range, that is, beyond the position shown in FIG. 2, flow increasing element 66 cooperating with metering port 48 when poppet 10 is at predetermined stop position beyond the range to provide a fluid flow rate to control chamber 22 greater than the fluid flow rate from control chamber 22 when valve member 56 is at a corresponding position as shown, for limiting the movement of poppet 10 in the direction denoted by arrow 64 beyond the stop position responsive to further increases in the fluid flow rate from control chamber 22.

Here, flow increasing element 66 is a bore extending from outer surface 46 of poppet 10 to conduit 50 (FIG. 3) and the stop position equates to a further displacement of poppet 10 in the direction shown by the arrow 64 in FIG. 2 where a flow rate of fluid through metering port 48 and flow increasing element 66 into control chamber 22 is greater than the flow rate from control chamber 22. Because poppet 10 moves in the direction denoted by arrow 64 responsive to increases in flow from control chamber 22, such movement will be stopped or substantially limited due to the substantial increase in flow rate possible through the combined areas of metering port 48 and flow increasing element 66. This is important as it eliminates the need for a physical stop member for preventing further movement of poppet 10 in the direction denoted by arrow 64 when poppet 10 has reached its maximum desired displacement from the closed position and the attendant problems discussed above.

Figure 4:
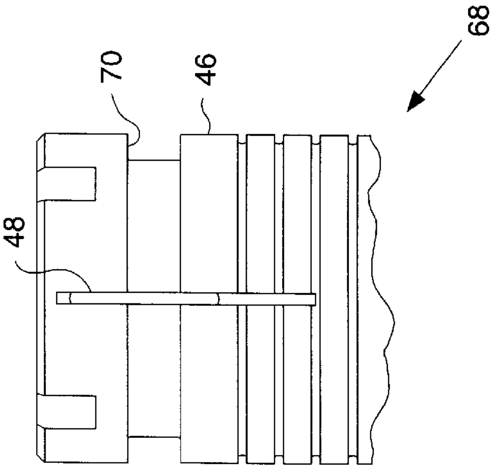
FIG. 4 is a fragmentary side elevational view of an alternative poppet construction according to the present invention.

FIG. 4 shows an alternative poppet 68 including a flow increasing element 70 according to the present invention which is an annular groove in outer surface 46 extending around poppet 10. Flow increasing element 70 is operable in the above described manner in cooperation with metering port 48 for increasing the fluid flow rate to control chamber 22 responsive to increases in the fluid flow rate from the control chamber 22 when poppet 68 is further displaced in the direction denoted by the arrow 64 (FIG. 2) to a desired stop position.

Figure 5:
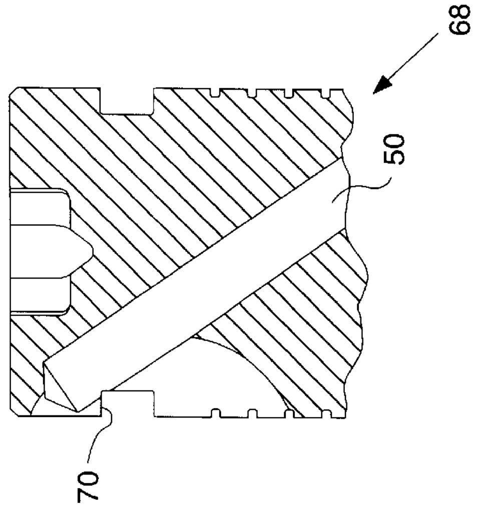
FIG. 5 is a fragmentary sectional view of the poppet of FIG. 4.

FIG. 5 is a cross-sectional view of poppet 68 showing flow increasing element 70 in communication with conduit 50 which extends through poppet 68.

Additionally, it should be noted that flow increasing elements 66 and 70 can be located at a desired alternative location on respective poppets 10 and 68 such that the stop position corresponds to a fluid flow rate from control chamber 22 less than the maximum rate, such that poppet 10 or 68 can be displaced in the direction denoted by the arrow 64 beyond the stop position when the fluid flow rate from control chamber 22 is further increased so as to exceed the fluid flow rate allowed into control chamber 22 through metering port 48 and the respective flow increasing element 66 or 70.

INDUSTRIAL APPLICABILITY

The present invention has utility for use in poppet valves for a wide variety of applications, such as for controlling the exhausting of hydraulic fluid from cylinders, motors and other working elements of a hydraulic system. The present poppet allows eliminating the need for physical stops for controlling movement of the poppet, and allows more easily and simply controlling or limiting movement of the poppet at desired displacements less than the maximum displacement thereof.

Other aspects, objects and advantages of the present invention can be obtained from a study of the drawings, the disclosure and the appended claims.

What is claimed is:

1. A poppet adapted for movement in a passage extending between an inlet port and a control chamber of a poppet valve for controlling a fluid flow rate into the control chamber from the inlet port responsive to changes in a fluid flow rate from the control chamber, the poppet comprising:

at least one metering port and a conduit connecting the metering port with an opening positioned for communicating with the inlet port for the flow of the fluid from the inlet port to the metering port, the metering port being positioned to be at least substantially covered by a sidewall of the poppet valve defining the passage when the poppet is in a closed position in the passage for preventing fluid flow between the inlet port and an outlet port of the poppet valve and increasingly exposed to the control chamber when the poppet is displaced from the closed position toward the control chamber for increasing the fluid flow rate to the control chamber responsive to increases in the fluid flow rate from the control chamber, and at least one flow increasing element communicating with the conduit positioned to be covered by the inner sidewall when the poppet is within a predetermined range of displacement from the closed position toward the control chamber and to be increasingly exposed to the control chamber when the poppet is displaced toward the control chamber beyond said range, the flow increasing element cooperating with the metering port when the poppet is at a predetermined stop position beyond said range to provide a fluid flow rate to the control chamber greater than the fluid flow rate from the control chamber for limiting the movement of the poppet beyond the stop position responsive to further increases in the fluid flow rate from the control chamber.

2. The poppet of claim 1 wherein the flow increasing element comprises a bore extending from an outer surface of the poppet to the conduit.

3. The poppet of claim 1 wherein the flow increasing element comprises a groove communicating with the conduit extending at least partially around the poppet.

4. The poppet of claim 1 wherein the poppet is movable beyond the stop position when the fluid flow rate from the control chamber exceeds the fluid flow rate thereto.

5. The poppet of claim 1 comprising two of the metering ports.

6. A poppet valve comprising:

a housing including an inlet port, an outlet port, a control chamber, and an inner sidewall defining a passage extending from the inlet port to the control chamber;

a control valve operable for controlling fluid flow from the control chamber; and a poppet adapted for movement in the passage for controlling a fluid flow rate into the control chamber from the inlet port responsive to changes in a fluid flow rate from the control chamber, the poppet including at least one metering port and a conduit connecting the metering port with the inlet port for the flow of the fluid from the inlet port to the metering port, the metering port being positioned to be at least substantially covered by the inner sidewall of the housing when the poppet is in a closed position in the passage for preventing fluid flow between the inlet port and the outlet port and increasingly exposed to the control chamber when the poppet is displaced from the closed position toward the control chamber for increasing the fluid flow rate to the control chamber responsive to increases in the fluid flow rate from the control chamber, and at least one flow increasing element communicating with the conduit positioned so as to be covered by the inner sidewall when the poppet is within a predetermined range of displacement from the closed position toward the control chamber and to be increasingly exposed to the control chamber when the poppet is displaced toward the control chamber beyond said range, the flow increasing element cooperating with the metering port when the poppet is at a predetermined stop position beyond said range to provide a fluid flow rate to the control chamber greater than the fluid flow rate from the control chamber for limiting the responsive movement of the poppet beyond the stop position.

7. The poppet valve of claim 6 wherein the flow increasing element comprises a groove communicating with the conduit extending at least partially around the poppet.

8. The poppet valve of claim 6 wherein the flow increasing element comprises a bore extending from an outer surface of the poppet to the conduit.

9. The poppet valve of claim 6 wherein the poppet is movable past the stop position when the fluid flow rate from the control chamber exceeds the fluid flow rate thereto.

* * * * *